(12) United States Patent
Sczesny et al.

(10) Patent No.: US 8,663,352 B2
(45) Date of Patent: Mar. 4, 2014

(54) SYSTEM FOR PURIFYING GAS

(75) Inventors: Jörg Sczesny, Gomaringen (DE);
Manfred Deutschmeyer, Perl (DE);
Bernhard Schlichter, Saarbrücken (DE)

(73) Assignee: Hydac Process Technology GmbH, Neunkirchen (DE)

( * ) Notice: Subject to any disclaimer, the term of this patent is extended or adjusted under 35 U.S.C. 154(b) by 26 days.

(21) Appl. No.: 13/377,941

(22) PCT Filed: May 4, 2010

(86) PCT No.: PCT/EP2010/002703
§ 371 (c)(1),
(2), (4) Date: Jan. 12, 2012

(87) PCT Pub. No.: WO2010/145731
PCT Pub. Date: Dec. 23, 2010

(65) Prior Publication Data
US 2012/0102899 A1    May 3, 2012

(30) Foreign Application Priority Data
Jun. 16, 2009  (DE) .......................... 10 2009 025 395

(51) Int. Cl.
*B01D 50/00*    (2006.01)
(52) U.S. Cl.
USPC ............... 55/337; 55/315; 55/317; 55/318; 55/320; 55/325; 55/327; 55/328; 55/331; 55/332; 55/423; 55/486; 55/459.1; 55/DIG. 17; 95/268; 95/269; 95/271

(58) Field of Classification Search
USPC ......... 55/315, 317, 423, 486, 459.1, DIG. 17, 55/318–337; 95/268–271
See application file for complete search history.

(56) References Cited

U.S. PATENT DOCUMENTS 3,535,853 A    10/1970  Brown et al.
2009/0223186 A1*  9/2009  Herges et al. .................... 55/317

FOREIGN PATENT DOCUMENTS

| DE | 89 00 369 | 5/1989 |
| DE | 603 05 536 | 11/2006 |
| DE | 10 2005 062245 | 6/2007 |
| WO | WO 2008/089833 | 7/2008 |
| WO | WO 2009/026662 | 3/2009 |

* cited by examiner

*Primary Examiner* — Dung H Bui
(74) *Attorney, Agent, or Firm* — Roylance, Abrams, Berdo and Goodman LLP

(57) ABSTRACT

A system for purifying as includes at least one housing (2) having a first chamber (6) into which the gas to be purified can flow, and a second chamber (10) forming a filter chamber, out of which the purified gas exits and with a filter device through which the gas can flow. The filter device has filter media (54) for separating out solid particles and for dehumidifying the gas for precipitating coalesced fluid. The first chamber (6) has a cyclone (60) for pre-dehumidifying the gas, from which dirt particles and fluids can be discharged into a third chamber (14) of the housing (2). The housing (2) is composed of an upper housing part (8) with the second chamber (10) forming the filter chamber, a middle housing part (4) with a first chamber (6) having the cyclone (60), and a lower housing part (12) forming the third chamber (14), that can be clamped together by at least one tensioning bolt (32), forming a closed pressure vessel.

16 Claims, 2 Drawing Sheets

SYSTEM FOR PURIFYING GAS

FIELD OF THE INVENTION

The invention relates to a system for purifying gas comprising at least one housing with a first chamber into which the gas to be purified can flow and a second chamber forming a filter chamber from which the purified gas issues and containing a filter device through which the gas can flow. The filter device has filter media for separating out solid particles and for dehydrating the gas for precipitation of the coalesced fluid. The first chamber comprises a cyclone pre-dehydrating the gas and from which the dirt particles and fluids can be discharged into a third chamber of the housing.

BACKGROUND OF THE INVENTION

Systems designed to eliminate pollutants due to solid loading and to dehydrate the relevant gaseous media are known and are referred to as coalescers if the fluid particles coalesce on the filter device located inside a housing. Systems of this type are often used in conjunction with exhaust gas-generating processes, where exhaust gas flows of comparatively high temperatures and optionally very high pressures are handled. In light of these requirements, a system of this type as disclosed in DE 10 2005 062 245 A1 has a housing designed as a pressure-tight container.

SUMMARY OF THE INVENTION

An object of the invention is to provide an improved system of this type that can be manufactured in a simple and efficient way at low production costs.

This object is basically achieved according to the invention by a system where the housing comprises individual components, that is, an upper housing part having the chamber forming the filter chamber, a middle housing part having the chamber containing the cyclone, and a lower housing part forming a third chamber. The housing parts can be clamped together by at least one tie rod to form the closed pressure container. Constructing the housing from a plurality of housing parts that are clamped together significantly simplifies the processing steps, as compared to a housing design wherein the housing wall extends over more than one inner working chamber, because there is no need to provide different working chambers inside the individual housing sections. In addition, the assembly work is simplified, because the system components, such as the filter device, the filter element holder, and the cyclone, that are to be installed are easier and simpler to install into the individual housing parts than into a housing that extends over several working chambers.

In advantageous exemplary embodiments, the lower housing part has the form of a cup that encloses the third chamber, is connected to the outlet of the cyclone and has a bottom that forms the anchorage for several tie rods. The cup bottom, which can be constructed with a suitable wall thickness, forms an especially secure anchorage base for an appropriate number of tie rods, so that the housing parts can be securely clamped together to form a composite container that is pressure tight.

In addition, the arrangement is configured preferably in such that the side wall of the cup of the lower housing part is formed by a cylinder jacket with a wall thickness adequate enough for the passage of several tie rods extending parallel to the cylinder axis.

To achieve a particular structural strength, the tie rods can be arranged on a circular line that concentrically encircles the interior of the cup. The clamping forces then act in a distributed manner relatively uniformly over the periphery of the housing.

In an especially advantageous way, the cylinder jacket of the middle housing part is contiguously aligned with the cylinder jacket of the lower housing part. The tie rods extend through the cylinder jacket of the middle housing part as far as into the cylinder jacket of the upper housing part. The upper housing part cylindrical jacket is also contiguously aligned with the cylinder jacket of the middle housing part, and with which the ends of the tie rods are screwed together. As a result, each tie rod forms a clamp clamping the lower housing part and the upper housing part against the middle housing part located between the upper and lower housing parts.

In especially advantageous exemplary embodiments, the butt joint between the cylindrical jackets of the upper housing part and the middle housing part and the butt joint between said middle housing part and the lower housing part can exhibit plane surfaces that form metal sealing surfaces subject to the action of the clamping force of the tie rods. Owing to the clamping force of the tie rods acting as the sealing force, the pressure-tight sealing of the housing is guaranteed so that there is no need to install sealing arrangements between the housing parts.

The installation of the system components into the housing can be done in an especially simple and advantageous way so that a transition piece is axially secured in position at the butt joint between the upper housing part and the middle housing part. This transition piece has a ring flange clamped at the butt joint and forming the element holder for a filter element of the filter device located in the second chamber.

In an analogous manner, a second transition piece can be axially secured in position at the butt joint between the middle housing part and the lower housing part. This second transition piece is clamped at the butt joint with a ring flange and forms a component of the cyclone.

The arrangement can be configured in such an especially advantageous way that the cylinder jacket of the lower housing part has at least one passage for a forcing rod. The forcing rod extends parallel to the axis from the bottom to the butt joint on the cylinder jacket of the middle housing part and can be pushed against the cylinder jacket of the middle housing part by the forcing screw of the bottom part. Such exemplary embodiments are distinguished by especially good operating behavior, because opening the housing—for example, for maintenance work—can be done very simply and easily because after loosening the tie rods, the lower housing part can be easily detached by the forcing rod from the middle housing part even if the middle housing part is firmly seated at the butt joint.

In an analogous manner, at least one additional forcing rod in a passage of the cylinder jacket of the middle housing part can be pressed against the butt joint of the upper housing part on its cylinder jacket. The upper housing part and the middle housing part can then be separated from one another, if desired, even if they are firmly seated at the butt joint.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
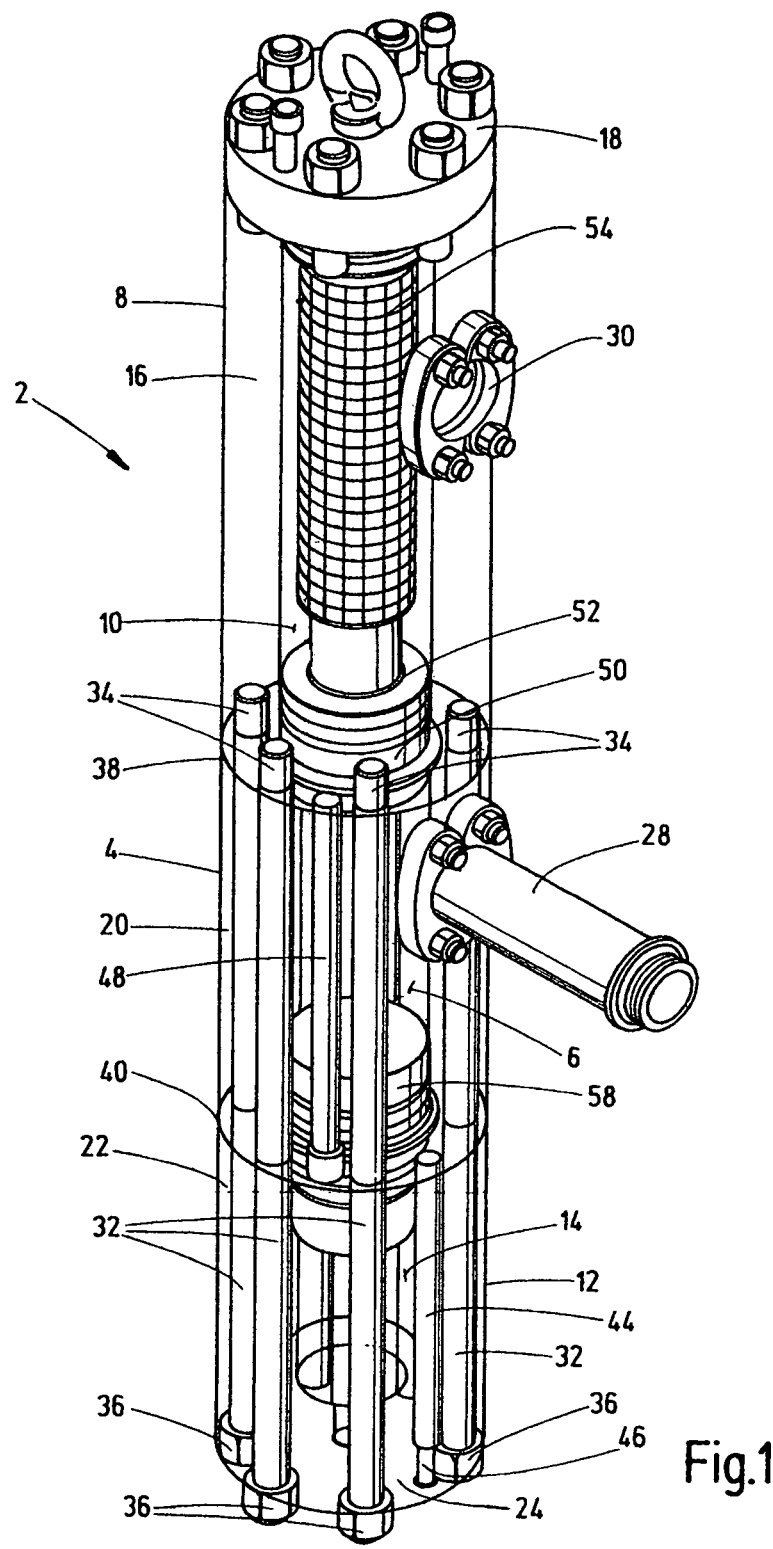
FIG. 1 is a highly schematized, perspective view of a system for purifying as according to an exemplary embodiment of the invention, wherein the wall portions of the housing are rendered transparent for a better understanding of the construction.

A housing 2, has a middle housing part 4 surrounding inner chamber 6, an upper housing part 8 surrounding a second inner chamber 10, and a lower housing part 12 in which a third inner chamber 14 is located. The upper housing part 8 has as a side wall a cylinder jacket 16. The upper end of jacket 16 is screwed to a housing cover 18 forming a pressure-tight housing closure. The side wall of the middle housing part 4 is formed by a cylinder jacket 20. In the drawing, the upper end of the cylinder jacket 20 is in contiguous alignment with the bottom end of the cylinder jacket 16 of the upper housing part 8. The bottom end of the cylinder jacket 20 of the middle housing part 4 is in turn contiguously aligned with the cylinder jacket 22 of the lower housing part 12. The lower housing part 12 has the shape of a cup with a bottom 24, which bottom sealingly closes the inner third chamber 14, and serves as a dirt and fluid chamber, except for a discharge port 26. Discharge port 24 can be closed by a device (not illustrated) and can be opened to remove the content substances of the chamber 14. A gas inlet pipe connection 28 for the infeed of the gas to be cleaned empties into the first chamber 6 of the middle housing part 4. A gas outlet 30 through which the cleaned gas can flow out of the third chamber 14, is located in the upper housing part 8.

As most clearly seen in FIG. 1, the housing parts 4, 8, and 12 are clamped together to form a unified, pressure-tight housing 2 by tie rods 32 in the form of steel rods. The tie rods 32 extend with their ends (lower ends in the drawing) through bores arranged in a uniformly distributed manner on a circular line, concentric to the cylinder axis, in the bottom 24 of the lower housing part 12. The tie rods extend through the passages in the cylinder jacket 22 of the lower part 12 and the passages in the cylinder jacket 20 of the middle part 4 as far as to the threaded bores in the cylinder jacket 16 of the upper part 8, where they are screwed together with their outer thread 34. The ends of the tie rods 32 that extend through the bottom 24 of the lower part 12 have an outer thread threadedly engaged with tightening nuts 36 on the outside of the bottom 24. Hence, by tightening the nuts 36, the upper housing part 8 can be clamped at the butt joint 38 against the middle housing part 4. Similarly, the lower housing part 12 can be clamped at the butt joint 40 against the middle housing part 4. At the butt joints 38 and 40, the cylinder jackets 16, 20, and 22 are in alignment with one another and form planar surfaces that act as a metal seal, subject to the action of the sealing force generated by the clamping force of the tie rods 32. The housing parts 4, 8, and 12 are then connected together so as to be pressure tight.

Figure 2:
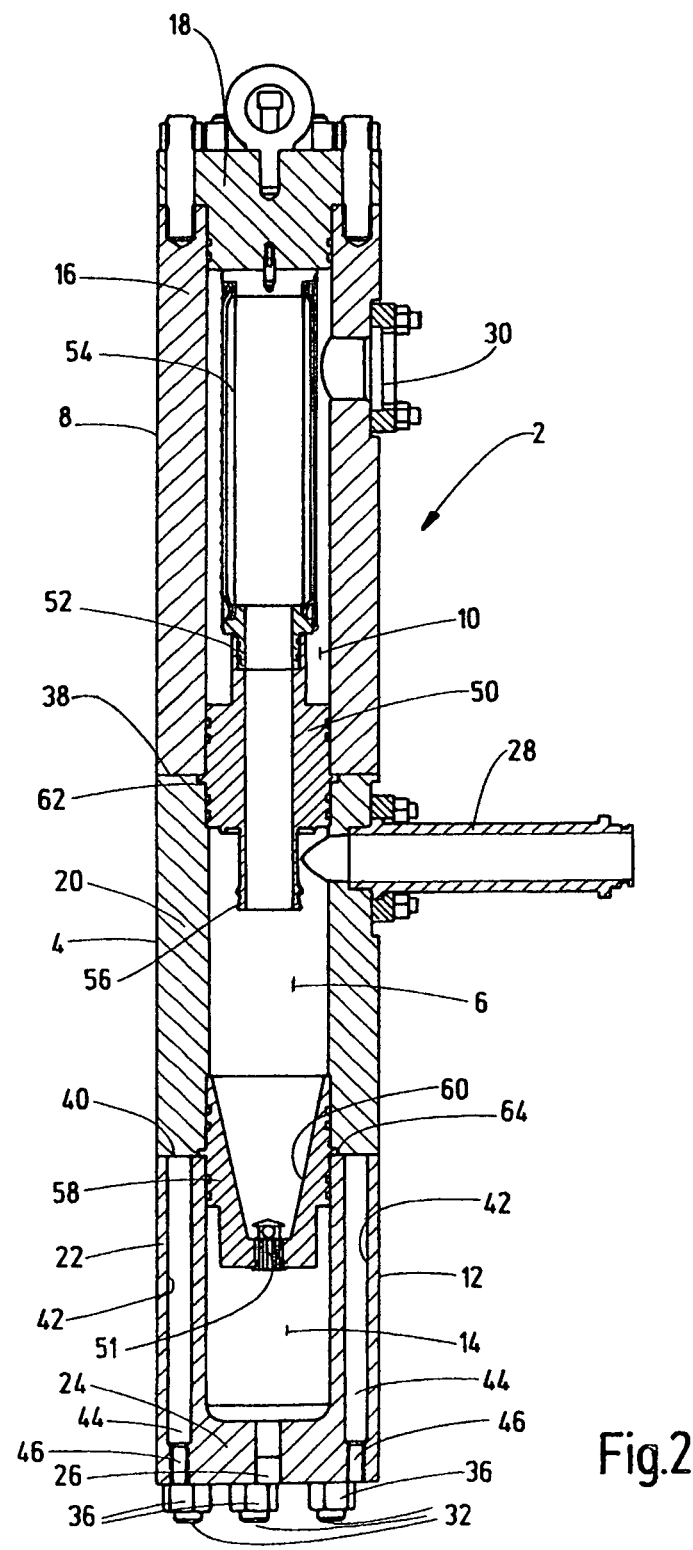
FIG. 2 is a schematic, side elevational view in section of the exemplary embodiment from FIG. 1.

The cylinder jacket 22 of the lower housing part 12 has, besides the passages for the tie rods 32, two additional passages 42 that extend parallel to the axis (see FIG. 2). A forcing rod 44 is located in each passage. The bottom ends of the forcing rods 44 terminate in front of the threaded bores 46 in the bottom 24. The upper ends of the forcing rods 44 are adjacent to the butt joint 40 on the cylinder jacket 20 of the middle housing part 4. When the forcing screws (not illustrated) are turned into the threaded bores 46 of the bottom 24 and when the tightening nuts 36 on the tie rods 32 are loosened, the lower housing part 12 can be pushed away from the middle housing part 4 by the forcing rods 44, if an opening of the housing 2 is desired. In an analogous manner, the forcing rods 48 extend from the cylinder jacket 22 at the butt joint 40 through the passages of the cylinder jacket 20 to the butt joint 38, where they rest against the cylinder jacket 16 of the upper housing part 8. When the forcing rods 48 are moved upward by the forcing screws (not illustrated), the upper housing part 8 can also be pushed away from the middle housing part 4.

To install the system components necessary for operating as a gas purifier, a transition piece 50 is inserted between the upper housing part 8 and the middle housing part 4 at the butt joint 38. The upper end of this transition piece forms the element holder 52 for the filter element 54 of the filter device located in the second chamber 10. The bottom end of this transition piece 50 designed as a hollow body forms a connecting piece 56 projecting into the first chamber 6, as a connection between the gas inflow chamber 6 and the inner filter cavity of the filter element 54.

Between the gas inflow chamber 6 and the third chamber 14 serving as the dirt and fluid chamber, the lower housing part 12 has a second transition piece 58. The conical interior of transition piece 58 is open toward the chamber 6 by an outlet 51 and forms the cyclone 60. In the same way as the first transition piece 50, the second transition piece 58 is also axially secured in position inside the housing 2 by a ring flange 62 or 64 protruding slightly in the radial direction. Each flange is clamped at the respective butt joint 38 or 40 between the adjacent housing parts 4 and 8 or housing parts 4 and 12. Owing to the divided design of the composite housing 2, the installation and assembly of the inner system components, like the filter element 54, the element holder 52, and the cyclone 60, is especially easy and fast.

The operating principle of the system and the filter device that is used may correspond to the prior art. In particular, the type of design described in document DE 10 2005 062 245 A1 can be provided for the filter element 54 of the filter device.

While one embodiment has been chosen to illustrate the invention, it will be understood by those skilled in the art that various changes and modifications can be made therein without departing from the scope of the invention as defined in the appended claims.

What is claimed is:

1. A system for purifying gas, comprising:
    a housing including an upper housing part, a middle housing part and a lower housing part, said upper, middle and lower housing parts having upper, middle and lower cylindrical jackets, respectively;
    first, second and third chambers located in said middle housing part, said upper housing part and said lower housing part, respectively, said first chamber receiving a gas flow to be purified, said second chamber containing a filter device through which the gas can flow, said filter device having filter media separating solid particles and dehydrating gas to precipitate coalesced fluid;
    a cyclone in said first chamber pre-dehydrating the gas and discharging the solid particles and fluid into said third chamber;
    at least one tie rod clamping said housing parts together so as to form a closed pressure container; and
    first and second butt joints between said upper and middle housing parts and between said middle and lower housing parts, respectively, said butt joints have planar surfaces forming directly engaged metal sealing surfaces subjected to a clamping force of said tie rod.

2. A system according to claim 1 wherein
said lower housing has a cup shape enclosing said third chamber and has a bottom forming an anchorage for said tie rod, said third chamber being connected to an outlet of said cyclone.

3. A system according to claim 2 wherein
said lower cylindrical jacket forms a side wall of the cup shape with a wall thickness adequate for passage of several tie rods therethrough parallel to a longitudinal axis of said housing.

4. A system according to claim 3 wherein
plural tie rods are arranged on a circular line concentrically encircling an interior of the cup shape.

5. A system according to claim 4 wherein
said middle cylindrical jacket is contiguously aligned with said lower cylindrical jacket; and
said tie rods extend through said middle cylindrical jacket and into said upper cylindrical jacket, said upper cylindrical jacket being contiguously aligned with said middle cylindrical jacket and connecting said tie rods together.

6. A system according to claim 1 wherein
a first transition piece is axially secured in position at said first butt joint, has a ring flange clamped at said first butt joint between said upper and middle cylindrical jackets and forms a holder supporting said filter device.

7. A system according to claim 1 wherein
a second transition piece is axially secured in position at said second butt joint, is clamped at said second butt joint by a ring flange located between said middle and lower cylindrical jackets points and forms a component of said cyclone.

8. A system according to claim 1 wherein
said lower cylindrical jacket comprises a first passage extending parallel to a longitudinal axis of said housing from a bottom of said lower cylindrical jacket to said second butt joint, said first passage receiving a first forcing rod, said first forcing rod abutting said middle cylindrical jacket.

9. A system according to claim 8 wherein
said middle cylindrical jacket comprises a second passage extending parallel to said longitudinal axis from a bottom of said middle cylindrical jacket to said first butt joint, said second passage receiving a second forcing rod, said second forcing rod abutting said upper cylindrical jacket.

10. A system for purifying gas, comprising:
a housing including an upper housing part, a middle housing part and a lower housing part, said upper, middle and lower housing parts having upper, middle and lower cylindrical jackets, respectively;
first, second and third chambers located in said middle housing part, said upper housing part and said lower housing part, respectively, said first chamber receiving a gas flow to be purified, said second chamber containing a filter device through which the gas can flow, said filter device having filter media separating solid particles and dehydrating gas to precipitate coalesced fluid;
a cyclone in said first chamber pre-dehydrating the gas and discharging the solid particles and fluid into said third chamber;
at least one tie rod clamping said housing parts together so as to form a closed pressure container; and
first and second butt joints between said upper and middle housing parts and between said middle and lower housing parts, respectively; and
a first transition piece being axially secured in position at said first butt joint, having a ring flange clamped at said first butt joint between said upper and middle cylindrical jackets and forming a holder supporting said filter device.

11. A system according to claim 10 wherein
a second transition piece is axially secured in position at said second butt joint, is clamped at said second butt joint by a ring flange located between said middle and lower cylindrical jackets and forms a component of said cyclone.

12. A system according to claim 10 wherein
said lower cylindrical jacket comprises a first passage extending parallel to a longitudinal axis of said housing from a bottom of said lower cylindrical jacket to said second butt joint, said first passage receiving a first forcing rod, said first forcing rod abutting said middle cylindrical jacket.

13. A system according to claim 12 wherein
said middle cylindrical jacket comprises a second passage extending parallel to said longitudinal axis from a bottom of said middle cylindrical jacket to said first butt joint, said second passage receiving a second forcing rod, said second forcing rod abutting said upper cylindrical jacket.

14. A system for purifying gas, comprising:
a housing including an upper housing part, a middle housing part and a lower housing part, said upper, middle and lower housing parts having upper, middle and lower cylindrical jackets, respectively;
first, second and third chambers located in said middle housing part, said upper housing part and said lower housing part, respectively, said first chamber receiving a gas flow to be purified, said second chamber containing a filter device through which the gas can flow, said filter device having filter media separating solid particles and dehydrating gas to precipitate coalesced fluid;
a cyclone in said first chamber pre-dehydrating the gas and discharging the solid particles and fluid into said third chamber;
at least one tie rod clamping said housing parts together so as to form a closed pressure container; and
first and second butt joints between said upper and middle housing parts and between said middle and lower housing parts, respectively; and
a transition piece being axially secured in position at said second butt joint, having a ring flange clamped at said first butt joint between said upper and middle cylindrical jackets and forming a component of said cyclone.

15. A system according to claim 14 wherein
said lower cylindrical jacket comprises a first passage extending parallel to a longitudinal axis of said housing from a bottom of said lower cylindrical jacket to said second butt joint, said first passage receiving a first forcing rod, said first forcing rod abutting said middle cylindrical jacket.

16. A system according to claim 15 wherein
said middle cylindrical jacket comprises a second passage extending parallel to said longitudinal axis from a bottom of said middle cylindrical jacket to said first butt joint, said second passage receiving a second forcing rod, said second forcing rod abutting said upper cylindrical jacket.

* * * * *